F. A. MORLEY.
Potato-Digger.
No. { 1,777, 32,781. }
Patented July 9. 1861.
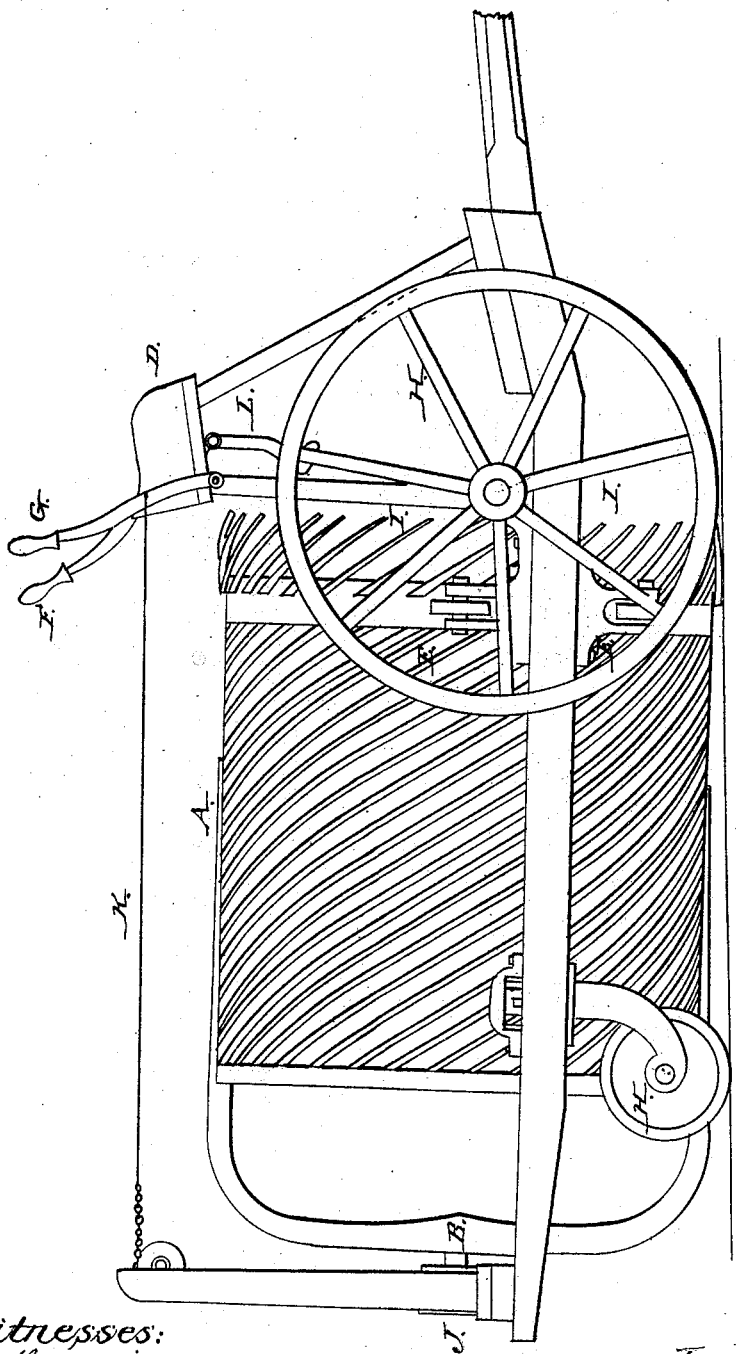

UNITED STATES PATENT OFFICE.

F. A. MORLEY, OF SODUS POINT, NEW YORK.

IMPROVEMENT IN POTATO-DIGGERS.

Specification forming part of Letters Patent No. 32,781, dated July 9, 1861.

*To all whom it may concern:*

Be it known that I, FRANKLIN A. MORLEY, of Sodus Point, in the county of Wayne and State of New York, have invented a new and Improved Machine for Digging Potatoes; and I do hereby declare that the following is a full and exact description thereof.

The nature of my invention relates to a peculiar construction and arrangement of a rotating cylinder, so as to perform both the digging and separating and at the same time be self-rotating, as hereinafter described.

To enable others skilled in the art to make and use my invention, I will proceed to describe its construction and operation, reference being made to the accompanying drawings, in which—

A represents a hollow rotating cylinder, formed by strips of wood or iron laid up in a spiral or screw form, having an extended center or bearing on its rear end at B, its forward end being open and working on external rollers, E E. The forward end of cylinder is provided with teeth, as shown at I I, which move in the ground beneath the potatoes, and are set in an angular form from the line of the vehicle's motion, so that as the machine moves forward the teeth wedge sidewise and cause the cylinder to rotate, the teeth being so shaped and arranged as to form the thread of a screw, the earth being the nut.

H H represent the wheels; D, the driver's seat; G F, the levers by which the cylinder is thrown up clear of the ground when not digging, the lever G being connected by the rod and chain K to the sliding box J, which receives the rear bearing, B. The lower end of the lever F is provided with an arm, L, which acts against the inside of the cylinder and raises its forward end.

The potatoes, vines, and earth entering the forward end of the cylinder are separated by the rotation of the cylinder, the dirt sifting through its sides, the potatoes and vines being carried out at the back end by the screw-formed slats forming the cylinder.

I do not claim a cylindrical separator, as such has been used heretofore; but

What I claim as my invention, and desire to secure by Letters Patent, is—

The combination of the spirally-arranged teeth I with the adjustable spirally-slatted cylinder R, constructed and operating in the manner described, for the purpose specified.

FRANKLIN A. MORLEY.

Witnesses:
C. A. WALDRON,
E. LEE.